United States Patent [19]
Niiyama et al.

[11] Patent Number: 5,634,864
[45] Date of Patent: Jun. 3, 1997

[54] HYDRAULIC CONTROL APPARATUS FOR HYDRAULICALLY OPERATED VEHICULAR TRANSMISSION

[75] Inventors: Tsunefumi Niiyama; Eiji Kitsutaka, both of Saitama-ken, Japan

[73] Assignee: Honda Giken Kogyo Kabushiki Kaisha, Tokyo, Japan

[21] Appl. No.: 592,806

[22] Filed: Jan. 26, 1996

[30] Foreign Application Priority Data

Jan. 30, 1995 [JP] Japan ................................. 7-013032

[51] Int. Cl.$^6$ ............................................... F16H 61/04
[52] U.S. Cl. ............................................... 475/128
[58] Field of Search .................................... 475/127, 128

[56] References Cited

FOREIGN PATENT DOCUMENTS 2-21063  1/1990  Japan .

*Primary Examiner*—Dirk Wright
*Attorney, Agent, or Firm*—Lyon & Lyon LLP

[57] ABSTRACT

A hydraulic oil pressure changeover mechanism for switching an input pressure to a solenoid valve between a high pressure and a low pressure. The changeover mechanism is made up of: a pressure reduction valve to be switched between an operating condition for outputting a low hydraulic oil pressure and a non-operating condition for outputting a high hydraulic oil pressure; a changeover valve to be switched between a low-pressure position for inputting an output pressure from the pressure reduction valve to the solenoid valve and a high-pressure position for inputting a hydraulic oil pressure to be supplied without passing through the pressure reduction valve to the solenoid valve; and a control valve to be switched between a first position for outputting a first signal pressure to switch the pressure reduction valve to the non-operating condition and a second position for outputting a second signal pressure which operates in a direction to switch the changeover valve to the low-pressure position. The changeover valve can be switched to the low-pressure position when the second signal pressure and a third signal pressure are operated on the changeover valve.

7 Claims, 3 Drawing Sheets

HYDRAULIC CONTROL APPARATUS FOR HYDRAULICALLY OPERATED VEHICULAR TRANSMISSION

BACKGROUND OF THE INVENTION

1. Field of the Invention

The present invention relates to a hydraulic control apparatus for a hydraulically operated transmission which is mainly used in a hydraulically operated transmission for a vehicle such as a motor vehicle.

2. Description of the Related Art

Conventionally, there is known an apparatus in which the pressure of the oil supply to hydraulic engaging elements provided in a hydraulically operated transmission is controlled by an output pressure of solenoid valves with duty control (hereinafter also called duty-controlled solenoid valves), whereby pressure increase characteristics and pressure decrease characteristics of the hydraulic engaging elements at the time of transmission or speed changing are controlled so as not to cause speed change shocks.

In order to prevent the occurrence of the speed change shocks, it is necessary to finely control the hydraulic oil pressure changes in a relatively low-pressure engagement transition region in which the hydraulic engaging elements transfer from a disengaged condition to an engaged condition. For that purpose, it is desirable to lower the input pressure to the solenoid valves to thereby minimize the rate of change of the output pressure to the duty ratio.

As a hydraulic control apparatus to meet this kind of requirements, there is conventionally known an apparatus provided with a hydraulic oil pressure changeover means comprising a pressure reduction valve, and a changeover valve which can be switched between a high-pressure position for inputting a high hydraulic oil pressure to solenoid valves and a low-pressure position for inputting a low hydraulic oil pressure from the pressure reduction valve to the solenoid valves. At the time of speed changing, the changeover valve is switched to the low-pressure position to lower the input pressure to the solenoid valves, and the changeover valve is switched to the high-pressure position after the speed changing has been completed to thereby increase the input pressure to the solenoid valves (see Japanese Published Unexamined Patent Application No. 21063/1990).

In the above-described conventional apparatus, when the changeover valve is restrained to the low-pressure position due to a trouble or failure by the inclusion of foreign matter or the like, the pressure of the hydraulic oil supply to the hydraulic engaging elements remains in the low pressure. As a result, when a transmitting torque increases due, for example, to the torque amplifying function of a fluid torque converter after the completion of speed changing, there will occur a slippage in the hydraulic engaging elements, resulting in a poor drivability (or a poor feeling to the driver of the vehicle).

In view of the above-described points, the present invention has an object of providing a hydraulic control apparatus for a hydraulically operated transmission in which the oil supply pressure (or the pressure of the hydraulic oil supply) to the hydraulic engaging elements is made high even if the apparatus fails or is in trouble, thereby securing a fail-safe operation.

SUMMARY OF THE INVENTION

In order to attain the above and other objects, the present invention is a hydraulic control apparatus for a hydraulically operated vehicular transmission in which an oil supply pressure to a hydraulic engaging element provided therein is controlled by an output pressure of a duty-controlled solenoid valve, the apparatus having a hydraulic oil pressure changeover means which can switch an input pressure to the solenoid valve between at least two stages of a high pressure and a low pressure, wherein the hydraulic oil pressure changeover means comprises: a pressure reduction valve which can be switched between an operating condition for outputting a low hydraulic oil pressure and a non-operating condition for outputting a high hydraulic oil pressure; a changeover valve which can be switched between a low-pressure position for inputting an output pressure from the pressure reduction valve to the solenoid valve and a high-pressure position for inputting a hydraulic oil pressure to be supplied without passing through the pressure reduction valve to the solenoid valve; and a control valve which can be switched between a first position for outputting a first signal pressure to switch the pressure reduction valve to the non-operating condition and a second position for outputting a second signal pressure which operates in a direction to switch the changeover valve to the low-pressure position, such that the changeover valve can be switched to the low-pressure position when the second signal pressure and a still further signal pressure are operated on the changeover valve.

Even if the changeover valve is restrained to the low-pressure position, the pressure reduction valve comes into the non-operating condition by the first signal pressure to be outputted from the control valve if the control valve is switched to the first position. The output pressure of the pressure reduction valve then becomes a high pressure, so that the input oil pressure to the solenoid valve becomes high, with the result that the oil supply pressure to the hydraulic engaging element can be made high.

Further, even if the control valve is restrained in the second position and the second signal pressure continuously operates on the changeover valve, the changeover valve is maintained in the high-pressure position unless said further signal pressure becomes low. The input pressure to the solenoid valve thus becomes high and consequently the oil supply pressure to the hydraulic engaging element can be made high.

In the embodiments to be described hereinafter, there is used as said further signal pressure an output pressure of a solenoid valve (fifth solenoid valve S5) for a hydraulic engaging element (second brake B2) that is not engaged in the D range for automatic speed changing, and an output pressure of a solenoid valve (second solenoid valve S2) for a hydraulic engaging element (second clutch C2) to be engaged at the time of establishing a high-speed transmission train. It is also possible to connect an oil chamber of the changeover valve for inputting therein said still further signal pressure to an oil passage for line pressure via a valve which is opened by receiving a hydraulic oil pressure of a hydraulic engaging element for a high-speed transmission train at the time of establishment of the high-speed transmission train, to thereby use the line pressure as said further signal pressure. According to this arrangement, when the low-speed transmission train is established, the changeover valve is maintained in the high-pressure position. Therefore, there is no such a disadvantage that the starting characteristics of the vehicle are poor due to lack of oil supply pressure to the hydraulic engaging element for the low-speed transmission train.

In case a fluid torque converter containing therein a lockup clutch is provided on the input side of a transmission, it is normal practice to provide the hydraulic control apparatus with a lockup shift valve for controlling the switching on and off of the lockup clutch. In this case, it is in a region requiring no torque amplification by means of the fluid torque converter that the lockup clutch is switched on. The hydraulic engaging element does not therefore give rise to slippage even if the oil supply pressure to the hydraulic engaging element is low. Consequently, if an arrangement is made that the control valve is integrally formed with the lockup shift valve such that the control valve can be switched to the second position by switching the shift valve to a lockup ON position (i.e., a locked up position), the construction can be simplified by integrating the shift valve and the control valve together without causing the disadvantage in point of fail-safe operation.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
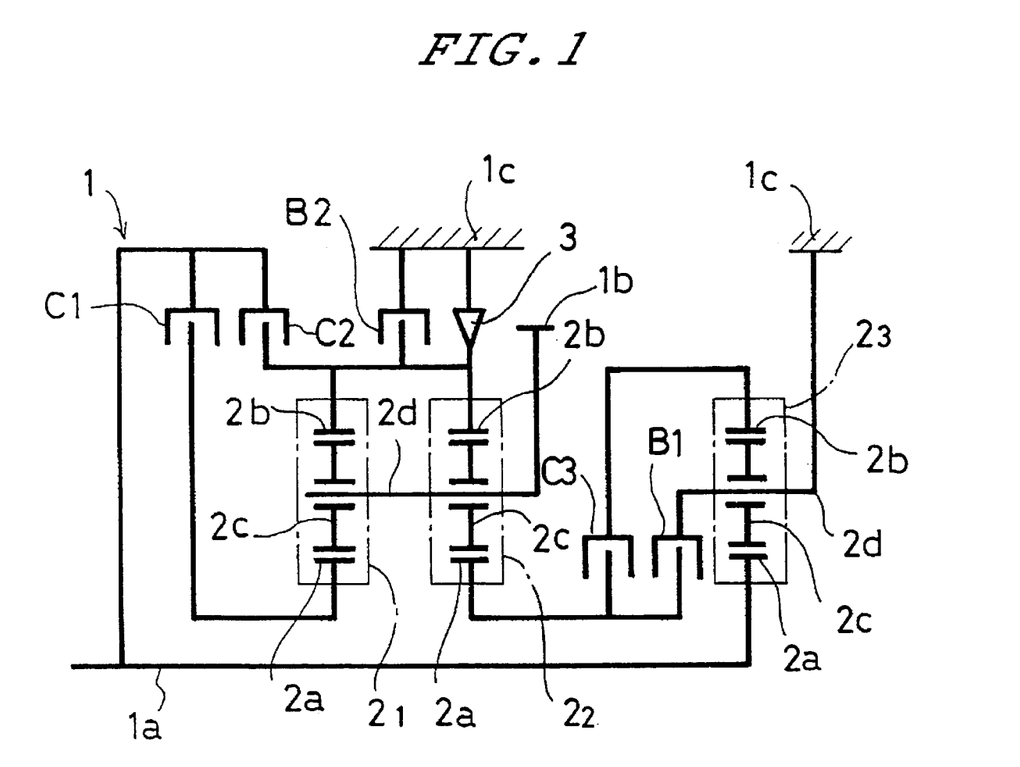
FIG. 1 is a skeleton diagram of an example of a transmission to which the present invention is applied.

With reference to FIG. 1, numeral 1 denotes a transmission. This transmission 1 is constituted by a planetary type of transmission provided with an input shaft 1a and a first through a third coaxially disposed three planetary gears $2_1$, $2_2$ and $2_3$ for effecting five forward transmission trains and one reverse transmission train.

Each of the planetary gears $2_1$, $2_2$ and $2_3$ comprises a sun gear 2a, a ring gear 2b, a pinion 2c which engages with both the gears 2a and 2b, and a carrier 2d which supports the pinion 2c. The ring gears 2b of both the first and the second planetary gears $2_1$ and $2_2$ and the carriers 2d of both the first and the second planetary gears $2_1$ and $2_2$ are respectively connected together, and an output gear 1b of the transmission 1 is connected to the carriers 2d of both the planetary gears $2_1$ and $2_2$. The ring gears 2b of both the planetary gears $2_1$ and $2_2$ are connected, via a one-way clutch 3 which serves as a reaction force receiver, to the casing 1c of the transmission 1. The sun gear 2a of the third planetary gear $2_3$ is connected to the input shaft 1a, and the carrier 2d of the third planetary gear $2_3$ is connected to the casing 1c to prevent rotation.

The transmission 1 is provided with the following as hydraulic engaging elements, i.e., a first clutch C1 for connecting the input shaft 1a to the sun gear 2a of the first planetary gear $2_1$, a second clutch C2 for connecting the input shaft 1a to the ring gears 2b of the first and the second planetary gears $2_1$ and $2_2$, a third clutch C3 for connecting the ring gear 2b of the third planetary gear $2_3$ to the sun gear 2a of the second planetary gar $2_2$, a first brake B1 for connecting the sun gear 2a of the second planetary gear $2_2$ to the carrier 2d of the third planetary gear $2_3$, and a second brake B2 for connecting the ring gears 2b of the first and the second planetary gears $2_1$ and $2_2$ to the casing 1c.

According to the above-described arrangement, when the first clutch C1 is engaged, the first-speed transmission train is established, when the first clutch C1 and the first brake B1 are both engaged, the second-speed transmission train is established, when the first clutch C1 and the third clutch C3 are both engaged, the third-speed transmission train is established, when the first clutch C1 and the second clutch C2 are both engaged, the fourth-speed transmission train is established, when the second clutch C2 and the third clutch C3 are both engaged, the fifth-speed transmission train is established, when the third clutch C3 and the second brake B2 are both engaged, the reverse transmission train is established, and when the first clutch C1 and the second brake B2 are both engaged, the first-speed transmission train is established in a condition in which the engine brake can be effected or applied.

Figure 2:
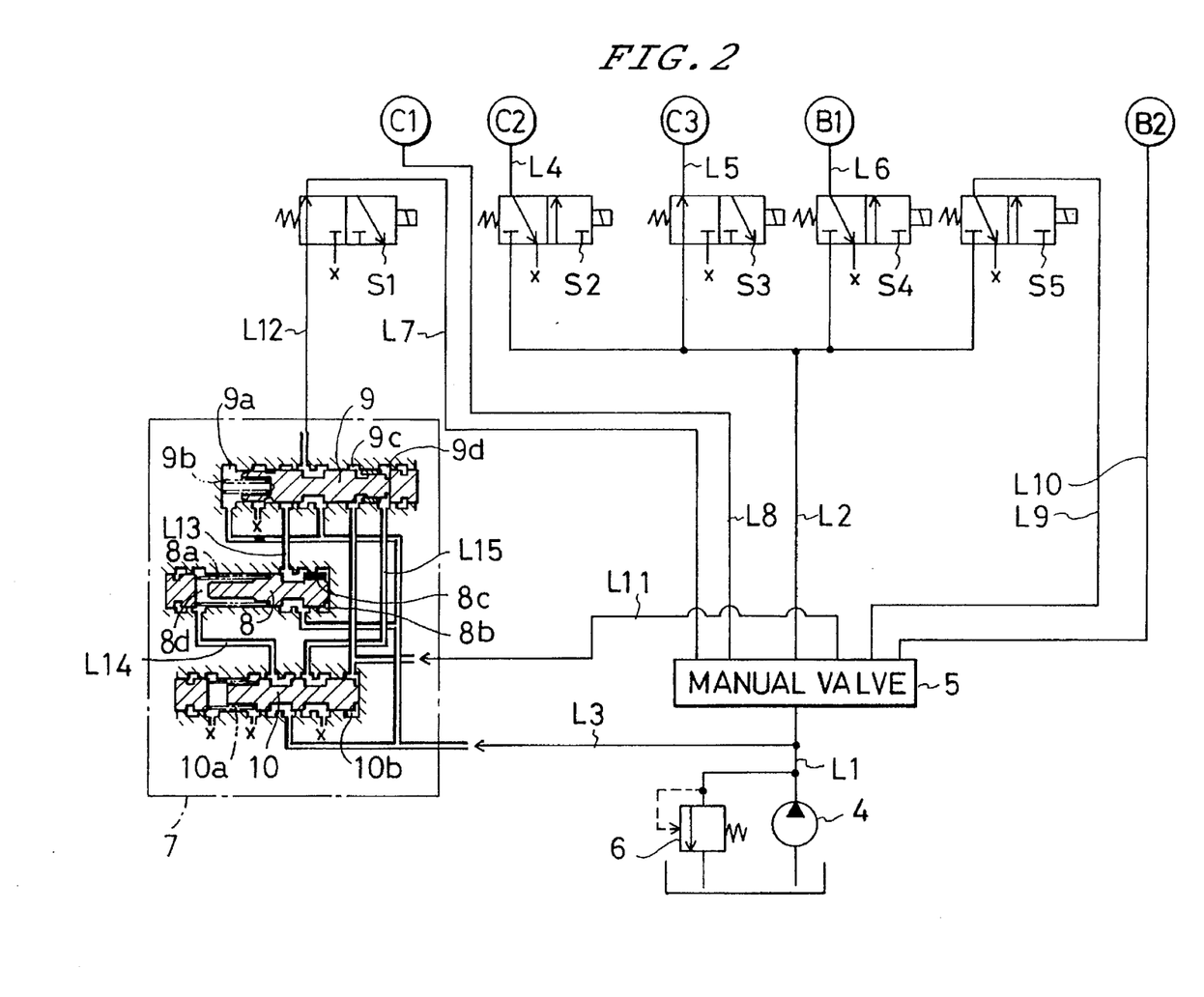
FIG. 2 is a hydraulic circuit diagram of one example of the present invention apparatus.

The operation of the clutches C1, C2 and C3 and the brakes B1 and B2 is controlled by the hydraulic circuit shown in FIG. 2. The hydraulic circuit is provided with a hydraulic oil source 4, a manual valve 5, five solenoid valves S1–S5 for independently controlling the oil supply and discharge to and from each of the hydraulic clutches C1, C2 and C3 and each of the brakes B1 and B2.

The manual valve 5 can be changed over or switched in interlocking with the operation of a selecting lever (not shown), among the R position for reverse running range, the N and P positions for neutral and parking ranges, the D position for automatic transmission (or speed changing) range, and the L position for first-speed holding range. In the D position and the L position, an oil passage L1 to be communicated with the hydraulic oil source 4 is connected to an oil passage L2, and pressurized oil regulated by a regulator 6 to a predetermined line pressure is supplied to the oil passage L2. The hydraulic oil is thus supplied via the oil passage L2 to the second solenoid valve S2 for the second clutch C2, the third solenoid valve S3 for the third clutch C3, the fourth solenoid valve S4 for the first brake B1, and the fifth solenoid valve S5 for the second brake B2. The first solenoid valve S1 for the first clutch C1 is always supplied with the hydraulic oil via an oil passage L3 branched from the first oil passage L1 and a hydraulic oil pressure changeover means 7, which is described hereinafter, irrespective of the manual valve 5.

To the second through the fourth solenoid valves S2, S3 and S4 there are directly connected the second clutch C2, the third clutch C3 and the first brake B1 via oil passages L4, L5 and L6 which are respectively on the downstream side of each solenoid valve. To an oil passage L7 which is on the downstream side of the first solenoid valve S1, there is connected an oil passage L8 to be communicated with the first clutch C1 via the manual valve 5 in its D position. To an oil passage L9 which is on the downstream side of the fifth solenoid valve S5, there is connected an oil passage L10 to be communicated with the second brake B2 via the manual valve 5 in its L position. Further, the oil passage L8 is connected to the oil passage L1 in the L position of the manual valve 5, and the oil passage L10 is connected to the oil passage L1 in the R position of the manual valve 5. In this arrangement, in the L position of the manual valve 5 the first clutch C1 is always engaged, and the first-speed transmission train is established in a condition in which, by the engagement of the second brake B2 due to the oil supply from the fifth solenoid valve S5, the engine brake can be effected or applied. In the R position of the manual valve 5 the second brake B2 is always engaged, and the reverse transmission train is established by the engagement of the third clutch C3 due to the oil supply from the third solenoid valve S3.

In the D position of the manual valve 5, it becomes possible to supply the hydraulic oil to all of the solenoid valves S1–S5. When the first clutch C1 is supplied with the hydraulic oil via the first solenoid valve S1 and is engaged, the first-speed transmission train is established. When the first clutch C1 and the first brake B1 are both supplied with the hydraulic oil via the first solenoid valve S1 and the fourth solenoid valve S4 and are engaged, the second-speed transmission train is established. When the first clutch C1 and the third clutch C3 are both supplied with the hydraulic oil via the first solenoid valve S1 and the third solenoid valve S3 and are engaged, the third-speed transmission train is established. When the first clutch C1 and the second clutch C2 are both supplied with the hydraulic oil via the first solenoid valve S1 and the second solenoid valve S2 and are engaged, the fourth-speed transmission train is established. When the second clutch C2 and the third clutch C3 are both supplied with the hydraulic oil via the second solenoid valve S2 and the third solenoid valve S3 and are engaged, the fifth-speed transmission train is established.

Each of the solenoid valves S1–S5 can be switched between an open condition in which the oil passage on the upstream side is communicated with the oil passage on the downstream side, and a closed position in which this communication is shut off to thereby connect the oil passage on the downstream side to an oil discharge port of each valve. In the D position, the opening and closing of the first through the fourth solenoid valves S1–S4 are controlled by an electronic control circuit (not shown) depending on the running conditions of the vehicle to thereby effect the automatic transmission or speed changing from the first-speed through the fifth-speed transmission trains. The first and the third solenoid valves S1 and S3 are arranged in normally-open type, and the second, the fourth and the fifth solenoid valves S2, S4 and S5 are arranged in normally-closed type.

The conditions of energization of the solenoid valves S1–S5 and the conditions of engagement of the hydraulic engaging elements at the time of establishing each transmission train in the D position, at the time of establishing the first-speed transmission train in the L position, and at the time of establishing the reverse transmission train in the R position are shown in Table 1. In the Table, the mark "O" shows that the hydraulic engaging element is in an engaged condition and the mark "-" shows that the hydraulic engaging element is in a disengaged condition.

pressure changeover mechanism 7 can be effected by the fifth solenoid valve S5.

The hydraulic oil pressure changeover mechanism 7 is constituted by a pressure reduction valve 8, a changeover valve 9 and a control valve 10. The hydraulic oil pressure to be inputted to the first solenoid valve S1 via an oil passage L12 on the downstream side of the changeover valve 9 can be switched between two stages of a high pressure and a low pressure. The pressure reduction valve 8 is urged or pushed to the rightward open side by a spring 8a and to the leftward closed position by that hydraulic oil pressure in a downstream side oil passage L13 which is operated on a right end oil chamber 8b via a communicating bore 8c. The line pressure to be inputted via the oil passage L3 into the pressure reduction valve 8 is outputted into the oil passage L13 after reduction to a pressure corresponding to the urging force of the spring 8a. Furthermore, an oil chamber 8d is formed on the left end of the pressure reduction valve 8 so that, by causing the hydraulic oil pressure to operate on the hydraulic oil chamber 8d, a high hydraulic oil pressure can be outputted to the oil passage L13.

The changeover valve 9 can be switched between the rightward high-pressure position (i.e., the illustrated position) in which the oil passage L3 is connected to the oil passage L12 to input the line pressure into the first solenoid valve S1, and the leftward low-pressure position in which the oil passage L13 is connected to the oil passage L12 to input the output pressure of the pressure reduction valve 8 to the first solenoid valve S1. The changeover valve 9 is urged towards the high-pressure position by the line pressure which is operated on a left end oil chamber 9a and by a spring 9b, and is urged towards the low-pressure position by the hydraulic oil pressure which is operated on a pair of oil chambers 9c and 9d disposed in the front and rear two stages on the right end side.

The control valve 10 can be switched between a rightward first position (i.e., the illustrated position) in which a first signal pressure equal to the line pressure to be supplied from the oil passage L3 is outputted to an oil passage L14 to be communicated with the oil chamber 8d of the pressure reduction valve 8, and a leftward second position in which a second signal pressure equal to the line pressure is outputted to an oil passage L15 to be communicated with the oil chamber 9d of the changeover valve 9. The control valve 10

TABLE 1

|   |   | Hydraulic engaging element | | | | | Solenoid valve | | | | |
|---|---|---|---|---|---|---|---|---|---|---|---|
|   |   | C1 | C2 | C3 | B1 | B2 | S1 | S2 | S3 | S4 | S5 |
| D | 1st speed | O | — | — | — | — | OFF | OFF | ON | OFF | OFF |
|   | 2nd speed | O | — | — | O | — | OFF | OFF | ON | ON | OFF |
|   | 3rd speed | O | — | O | — | — | OFF | OFF | OFF | OFF | OFF |
|   | 4th speed | O | O | — | — | — | OFF | ON | ON | OFF | OFF |
|   | 5th speed | — | O | O | — | — | ON | ON | OFF | OFF | OFF |
| R |   | — | — | O | — | O | OFF | OFF | OFF | OFF | OFF |
| L |   | O | — | — | — | O | OFF | OFF | ON | OFF | ON |

In the D position, the second brake B2 does not contribute to the speed changing. Therefore, an arrangement is made such that an oil passage L9 on the downstream side of the fifth solenoid valve S5 is connected, in the D position, via the manual valve 5 to an oil passage L11 which is for controlling the hydraulic oil pressure changeover means or mechanism 7 so that the switching of the hydraulic oil is urged towards the first position by a left end spring 10a and is urged towards the second position by the hydraulic oil pressure which is operated on a right end oil chamber 10b.

A third signal pressure to be outputted from the fifth solenoid valve S5 is operated on the oil chamber 9c of the changeover valve 9 and the oil chamber 10b of the control valve 10 via the oil passage L11. When the third signal pressure is outputted by opening the fifth solenoid valve S5, the control valve 10 is switched to the second position. Outputting of the first signal pressure to the oil passage L14 is thus stopped, with the result that the pressure reduction valve 8 becomes an operating condition in which a low hydraulic oil pressure is outputted and that the second signal pressure is outputted to the oil passage L15. The changeover valve 9 is thus switched to the low-pressure position by the operation of the third signal pressure to the oil chamber 9c as well as the operation of the second signal pressure to the oil chamber 9d. The oil passage L13 is thus connected to the oil passage L12, so that the low hydraulic oil pressure from the pressure reduction valve 8 is inputted to the first solenoid valve S1.

The speed changing to effect the engagement or disengagement of the first clutch C1 is the speed changing between the fourth speed and the fifth speed. Since this speed changing is effected in a condition of relatively small transmitting torque, the clutching or engaging pressure in which the first clutch C1 becomes a transient engaging condition is a relatively small pressure. Therefore, in the speed changing between the fourth speed and the fifth speed, the fifth solenoid valve S5 is opened to thereby make the input pressure of the first solenoid valve S1 low so that the pressure decrease characteristics (at the time of upshifting to the fifth speed) and the pressure rise characteristics (at the time of downshifting to the fourth speed) of the clutch pressure of the first clutch C1 can be finely controlled in the low-pressure transient engaging region by the duty control of the first solenoid valve S1. After the speed changing has been completed, the fifth solenoid valve S5 is closed to stop the outputting of the third signal pressure. According to this arrangement, the changeover valve 9 is switched to the high-pressure position to thereby connect the oil passage L3 to the oil passage L12. The input pressure to the first solenoid valve S1 thus becomes a high pressure (line pressure), so that the clutch pressure of the first clutch C1 after downshifting to the fourth speed can be boosted up to the line pressure. There will, therefore, occur no slippage in the first clutch C1 even if the transmitting torque may increase thereafter.

By the way, even if the outputting of the third signal pressure has been stopped, there is a possibility that the changeover valve 9 will not return to the high-pressure position due, for example, to the inclusion of foreign matter. Even if the changeover valve 9 is restrained to the low-pressure position in this manner, in the present embodiment, the control valve 10 is switched to the first position upon stopping of the outputting of the third signal pressure. The first signal pressure is then outputted to the oil passage L14, and the pressure reduction valve 8 comes into the non-operating condition by the operation of the first signal pressure on the oil chamber 8d, thereby outputting the line pressure to the oil passage L13. Therefore, the input pressure to the first solenoid valve S1 becomes the line pressure and consequently there will occur no slippage in the first clutch C1.

Further, even by stopping the outputting of the third signal pressure, there is still a possibility that the control valve 10 is restrained to the second position to thereby maintain the pressure reduction valve 8 in the operating condition. In this case, if the changeover valve 9 is switched to the low-pressure position only by the second signal pressure to be outputted to the oil passage L15 in the second position of the control valve 10, the input pressure to the first solenoid valve S1 remains low. However, since an arrangement is made in the present embodiment such that the changeover valve 9 is switched to the low-pressure position when both the second signal pressure and the third signal pressure are outputted, the changeover valve 9 is switched to the high-pressure position by the stopping of the outputting of the third signal pressure. The input pressure to the first solenoid valve S1 thus becomes the line pressure and the slippage in the first clutch C1 does not occur.

When the changeover valve 9 is restrained to the low-pressure position and also the control valve 10 is restrained to the second position, the input pressure to the first solenoid valve S1 remains to be low. But since there is little or no possibility that both the changeover valve 9 and the control valve 10 fail at the same time, there is practically no problem.

The speed changing between the second speed and the third speed and the speed changing between the third speed and the fourth speed are effected in a condition of a relatively large transmitting torque. Therefore, the second clutch C2, the third clutch C3 and the first brake B1 that are engaged or disengaged in the above-described speed changing become engaging transient conditions at a relatively high pressure. Therefore, in the above-described embodiment, the following arrangement is made. Namely, the solenoid valves S2, S3 and S4 are duty-controlled in a condition in which the input pressure to the second solenoid valve S2 for the second clutch C2, the third solenoid valve S3 for the third clutch C3 and the fourth solenoid valve S4 for the first brake B1 are maintained to the line pressure, thereby controlling the pressure rise characteristics and the pressure decrease characteristics at the time of speed changing. If necessary, the input pressure to the solenoid valves S2, S3 and S4 may be made lower than the line pressure by means of the same oil pressure changeover mechanism as the one described hereinabove.

Figure 3:
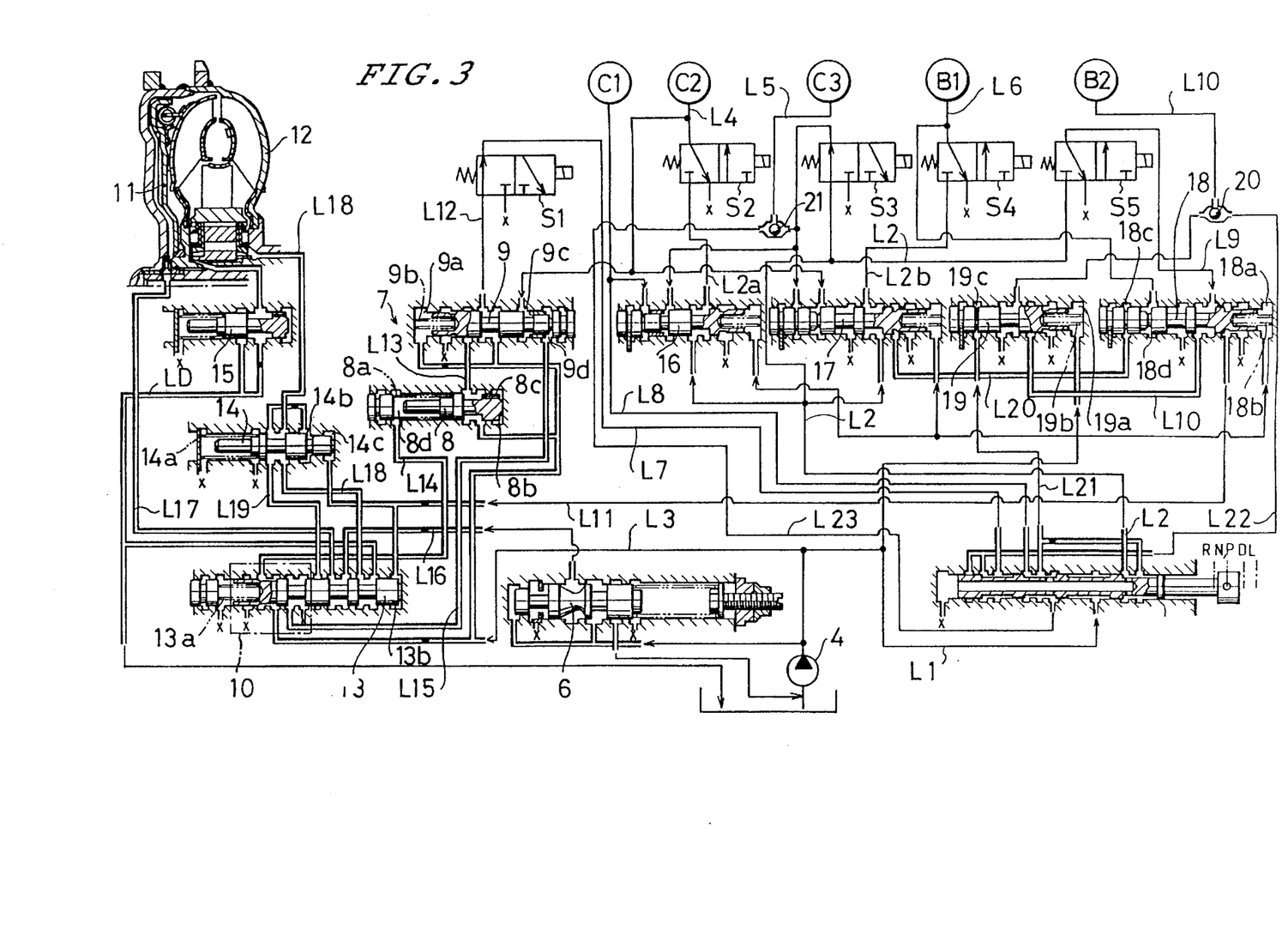
FIG. 3 is a hydraulic circuit diagram of another example of the present invention apparatus.

FIG. 3 shows an embodiment in which a fluid torque converter 12 containing therein a lockup clutch 11 is provided on an input side of the transmission 1 shown in FIG. 1. In the hydraulic control circuit there are provided a lockup shift valve 13 for controlling the lockup clutch 11, a lockup adjusting valve 14 for adjusting the engaging force of the lockup clutch 11, and an adjusting valve 15 which is interposed in an oil discharge passage LD to be communicated with an internal space of the fluid torque converter 12.

The shift valve 13 can be switched between a rightward lockup OFF position (i.e., the illustrated position) in which an oil supply passage L16 to be communicated with the regulator 6 is connected to an oil passage L17 to be communicated with the back pressure chamber of the lockup clutch 11 and also in which an oil passage L18 to be communicated with the internal space of the fluid torque converter 12 is connected to the oil discharge passage LD through the lockup adjusting valve 14, and the leftward lockup ON position in which the oil passage L16 is connected to the oil passage L18 and also in which the oil passage L17 is connected to an oil passage L19 to be communicated with the lockup adjusting valve 14. The shift valve 13 is urged towards the OFF position by a spring 13a and is urged towards the lockup ON position by the hydraulic oil pressure to be operated on a right end oil chamber 13b. The adjusting valve 14 is urged by a spring 14a towards the rightward open side in which an oil passage L19 is communicated with the oil passage L18. There are provided two stages of front and rear oil chambers 14b and 14c on the right end side of the adjustinig valve 14. The hydraulic oil pressure of the oil passage L19 is operated on the oil chamber 14b so that the hydraulic oil pressure in the oil passage L19 is caused to be reduced depending on the hydraulic oil pressure to be operated on the oil chamber 14c.

The output pressure of the fifth solenoid valve S5 is operated on the oil chamber 13b of the shift valve 13 and the oil chamber 14c of the adjusting valve 14 via the oil passage L11. When the output pressure P of the fifth solenoid valve S5 has become larger than a first setting pressure P1, the shift valve 13 is switched to the lockup ON position. When the output pressure P has become larger than a second setting pressure P2 which is set above P1, the adjusting valve 14 moves leftwards from the right end fully open position so that the hydraulic oil pressure in the oil passage L19 is thereafter reduced as a result of the increase in the output pressure P.

In this arrangement, when the output pressure P is varied by duty control of the fifth solenoid valve S5, the lockup clutch 11 is controlled in the following manner. Namely, when the shift valve 13 is in the lockup OFF position in a condition of P<P1, the oil passage L16 is connected to the oil passage L17 to thereby supply the hydraulic oil to the fluid torque converter 12 from the back pressure chamber side of the lockup clutch 11, and also the oil passage L18 is connected to the oil discharge passage LD, so that the hydraulic oil pressure in the internal space of the fluid torque converter 12 (torque converter pressure) becomes low. As a result, the lockup clutch 11 is switched off. When the shift valve 13 is switched to the lockup ON position in a condition of P≧P1, the oil passage L16 is connected to the oil passage L18. The hydraulic oil is then supplied to the internal space of the fluid torque converter 12, and consequently the torque converter pressure becomes a relatively high pressure to be defined by the adjusting valve 15, thereby urging the lockup clutch 11 towards the engaging direction. In a condition of P1≦P<P2, the adjusting valve 14 is fully opened and the hydraulic oil pressure in the oil passage L19 becomes equal to that in the oil passage L18. Here, in the lockup ON position of the shift valve 13, since the hydraulic oil pressure in the oil passage L19 is inputted to the back pressure chamber of the lockup clutch 11 via the oil passage L17, the urging force to operate on the lockup clutch 11 in the direction of its engagement and the urging force in the direction of its disengagement become equal to each other. The lockup clutch 11 is therefore maintained substantially in the OFF position. Once the condition becomes P≧P2, since the hydraulic oil pressure in the oil passage L19 is reduced below the hydraulic oil pressure in the oil passage L18, the lockup clutch 11 becomes an ON condition and the engaging force of the lockup clutch 11 increases according to the increase in the output pressure P.

The hydraulic oil pressure changeover mechanism 7 for switching the input pressure to the first solenoid valve S1 into two stages of a high pressure and a low pressure is made up, like in the above embodiment, of the pressure reduction valve 8, the changeover valve 9 and the control valve 10. In this embodiment, the control valve 10 is formed integrally with the shift valve 13 and an arrangement is made as follows. Namely, when the shift valve 13 is in the lockup OFF position, a condition is attained in which the first signal pressure is outputted to the oil passage L14 to be communicated with the oil chamber 8d of the pressure reduction valve 8, i.e., a condition in which the control valve 10 is in the first position. When the shift valve 13 is in the lockup ON position, a condition is attained in which the second signal pressure is outputted to the oil passage L15 to be communicated with the oil chamber 9d of the changeover valve 9, i.e., a condition in which the control valve 10 is in the second position.

A further arrangement is made as follows. Namely, the clutch pressure of the second clutch C2 to be engaged at the time of the fourth speed and the fifth speed is used as the third signal pressure to be operated on the oil chamber 9c of the changeover valve 9. Therefore, when the second signal pressure is outputted from the control valve 10 as a result of switching of the shift valve 13 to the lockup ON position at the time of the fourth speed and the fifth speed, the changeover valve 9 is switched to the low-pressure position. The hydraulic oil pressure of low pressure to be outputted from the pressure reduction valve 8 is inputted to the first solenoid valve S1 via the oil passage L13 and the oil passage L12.

At the time of the fourth speed and the fifth speed, it is arranged to normally switch on the lockup clutch 11. Therefore, the input pressure to the first solenoid valve S1 is maintained low not only during the fourth speed and the fifth speed but also after the speed changing. The transmitting torque at the time of the fourth speed and the fifth speed is however relatively small and therefore there is no possibility of giving rise to slipping of the first clutch C1.

Further, the occurrence of speed change shocks are sometimes restrained due to the slipping in the fluid torque converter 12 by switching off the lockup clutch 11 at the time of speed changing. But, if the output pressure P of the fifth solenoid valve S5 is made to be P1≦P<P2, the lockup clutch 11 can be maintained in the OFF position even if the shift valve 13 is switched to the lockup ON position, i.e., even if the changeover valve 9 is switched to the low-pressure position by switching the control valve 10 to the second position. In this manner, the input pressure to the first solenoid valve S1 is made to be low to thereby improve the control accuracy of the clutch pressure of the first clutch C1, and also by utilizing the slipping in the fluid torque converter 12 the occurrence of the speed change shocks can be effectively prevented.

Since the clutch pressure of the second clutch C2, which is the third signal pressure, is not operated at the time of the first speed through the third speed, the changeover valve 9 is in the low-pressure position. However, in the region in which the lockup clutch 11 is switched off to obtain the torque amplifying effect of the fluid torque converter 12, the control valve 10 is in the first position by the switching of the shift valve 13 to the lockup OFF position. As a result, the pressure reduction valve 8 becomes the non-operating condition by the first signal pressure, and the input pressure to the first solenoid valve S1 becomes high, thereby causing no slipping in the first clutch C1.

Further, even if the output pressure P remains high due to failure of the fifth solenoid valve S5 or even if, due to the inclusion of foreign matter, the shift valve 13 is restrained to the lockup ON position with the result that the second signal pressure is kept on outputting from the control valve 10, the changeover valve 9 is maintained in the high-pressure position until the vehicle has been upshifted to the fourth speed and the fifth speed. Therefore, even if the transmission torque increases at the time of the first speed through the third speed, there will occur no slippage in the first clutch C1.

In the embodiment shown in FIG. 3, in an oil passage L2a corresponding to the second solenoid valve S2 there is interposed a first shutoff valve 16 which shuts off the communication of the supply oil passage L2a by the hydraulic oil pressure of the first clutch C1 and the third clutch C3 at the time of establishment of the third-speed transmission train in which both the first clutch C1 and the third clutch C3 are engaged. In an oil passage L2b corresponding to the fourth solenoid valve S4 there is interposed a second shutoff valve 17 which shuts off the communication of the oil supply passage L2b by the hydraulic oil pressures of the second clutch C2 and the third clutch C3 at the time of establishment of the third-speed transmission train through the fifth-speed transmission train in which either one of the second clutch C2 and the third clutch C3 is engaged. Therefore, even if the second solenoid valve S2 is wrongly opened during the establishment of the third-speed transmission train, the second clutch C2 will not be engaged. And even if the fourth solenoid valve S4 is wrongly opened during the establishment of any one of the third-speed transmission train through the fifth-speed transmission train, the first brake B1 will not be engaged.

In the embodiment shown in FIG. 2, the oil passage L9 on the downstream side of the fifth solenoid valve S5 is arranged to be connected to the oil passage L11 which controls the hydraulic changeover means 7 via the manual valve 5 in its D position as well as to the oil passage L10 to be communicated with the second brake B2 in its L position. In the embodiment shown in FIG. 3, on the other hand, it is so arranged that the oil passage L9 can be selectively connected to the oil passage L10 and the oil passage L11 via a selection valve 18 which is other than the manual valve 5. The selection valve 18 can be switched between the leftward first position (i.e., the illustrated position) in which the oil passage L9 is connected to the oil passage L10 and the rightward second position in which the oil passage L9 is connected to the oil passage L11. The selection valve 18 is normally maintained in the first position by the line pressure inputted to a right end oil chamber 18a and by a spring 18b, and is switched to the second position by inputting the hydraulic oil pressure to each of oil chambers 18c and 18d which are provided in the front and rear two stages on the left end. To the oil chamber 18c there is connected an oil passage L20 to be connected to the oil passage L2 via the second shutoff valve 17 when it is switched to the position in which the communication of the oil passage L2b is shut off, i.e., when any one of the third-speed transmission train through the fifth-speed transmission train is established. Further, to the oil chamber 18d there is connected the oil passage L6 to be communicated with the first brake B1.

In this arrangement, when any one of the second-speed transmission train through the fifth-speed transmission train is established, the selection valve 18 is switched to the second position to thereby connect the oil passage L9 to the oil passage L11. The hydraulic oil changeover means or mechanism 7 and the lockup clutch 11 become possible to be controlled by the output pressure of the fifth solenoid valve S5.

In the oil passage L10 to be communicated with the second brake B2, there is provided a gate valve 19 which can be switched between a leftward closed position (i.e., the illustrated position) and a rightward open position. This gate valve 19 is normally maintained in the closed position by the line pressure inputted to a right end oil chamber 19a and by a spring 19b, and can be switched to the open position by inputting the hydraulic oil pressure to a left end oil chamber 19c. To this oil chamber 19c there is connected an oil passage L21 to be connected to the oil passage L1 via the manual valve 5 in the L position thereof. In the L position, the gate valve 19 is switched to the open position and the oil passage L10 is communicated, and the oil passage L10 is connected to the oil passage L9 via the selection valve 18. The supply and discharge of the hydraulic oil to and from the second brake B2 thus becomes possible to be controlled by the fifth solenoid valve S5.

Further, the following arrangement is made. Namely, there is provided an oil passage L22 which is connected to the oil passage L10 via a shuttle valve 20. In the R position of the manual valve 5, this oil passage L22 is connected to the oil passage L7 which is on the downstream side of the first solenoid valve S1, via the manual valve 5 so that the supply and discharge of the hydraulic oil to and from the second brake B2 can be controlled by the first solenoid valve S1 in the R position. Also, there is provided an oil passage L23 to be connected to the oil passage L1 via the manual valve 5 in the R position of the manual valve 5 to thereby connect the oil passage L23, via a shuttle valve 21, to the oil passage L5 to be communicated with the third clutch C3. In this manner, in the R position, the third clutch C3 is arranged to be always engaged.

An explanation has so far been made about the hydraulic control apparatus for a planetary type of hydraulically operated vehicular transmission. The present invention can also be applied to a hydraulic control apparatus for a two-parallel-shaft type of hydraulically operated vehicular transmission.

As can be seen from the above explanations, according to the present invention, it can be prevented to the best extent possible that, due to failure or trouble, the input pressure to the solenoid valves remains low. Therefore, the drivability can be prevented from becoming poor due to slippage in the hydraulic engaging elements. Further, when a fluid torque converter with a lockup clutch is provided, the construction can be made simpler by combining the lockup shift valve and the control valve.

It is readily apparent that the above-described hydraulic control apparatus for a hydraulically controlled vehicular transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A hydraulic control apparatus for a hydraulically operated vehicular transmission in which an oil supply pressure to a hydraulic engaging element provided therein is controlled by an output pressure of a duty-controlled solenoid valve, said apparatus having a hydraulic oil pressure changeover means which can switch an input pressure to said solenoid valve between at least two stages of a high pressure and a low pressure, wherein said hydraulic oil pressure changeover means comprises:
   a pressure reduction valve which can be switched between an operating condition for outputting a low hydraulic oil pressure and a non-operating condition for outputting a high hydraulic oil pressure;
   a changeover valve which can be switched between a low-pressure position for inputting an output pressure from said pressure reduction valve to said solenoid valve and a high-pressure position for inputting a hydraulic oil pressure to be supplied without passing through said pressure reduction valve to said solenoid valve; and
   a control valve which can be switched between a first position for outputting a first signal pressure to switch said pressure reduction valve to the non-operating condition and a second position for outputting a second signal pressure which operates in a direction to switch said changeover valve to said low-pressure position, such that said changeover valve can be switched to said low-pressure position when said second signal pressure and a still further signal pressure are operated on said changeover valve.

2. A hydraulic control apparatus according to claim 1, wherein said still further signal pressure is an output pressure of a solenoid valve which is free from contribution to speed changing in an automatic transmission range.

3. A hydraulic control apparatus according to claim 1, wherein said still further signal pressure is a hydraulic oil pressure which is generated when a transmission train, which is higher than a transmission train to be established by said hydraulic engaging element, is established.

4. A hydraulic control apparatus according to claim 1, wherein an oil chamber of said changeover valve for inputting therein said still further signal pressure is connected to an oil passage for line pressure when a transmission train, which is higher than a transmission train to be established by said hydraulic engaging element, is established.

5. A hydraulic control apparatus according to claim 1, wherein said control valve is integrally formed with a lockup shift valve for controlling to switch on and off a lockup clutch contained inside a fluid torque converter on an input side of said transmission such that said control valve can be switched to said second position by switching said shift valve to a lockup ON position.

6. A hydraulic control apparatus for a hydraulically operated vehicular transmission in which an oil supply pressure to a hydraulic engaging element provided therein is controlled by an output pressure of a duty-controlled solenoid valve, said apparatus having a hydraulic oil pressure changeover means which can switch an input pressure to said solenoid valve between at least two stages of a high pressure and a lows pressure, wherein said hydraulic oil pressure changeover means comprises:

a pressure reduction valve which can be switched between an operating condition for outputting a low hydraulic oil pressure and a non-operating condition for outputting a high hydraulic oil pressure;

a changeover valve which can be switched between a low-pressure position for inputting an output pressure from said pressure reduction valve to said solenoid valve and a high-pressure position for inputting a hydraulic oil pressure to be supplied without passing through said pressure reduction valve to said solenoid valve; and a control valve which can be switched between a first position for outputting a first signal pressure to switch said pressure reduction valve from the operating condition to the non-operating condition and a second position for outputting a second signal pressure which operates in a direction to switch said changeover valve from said high-pressure position to said low-pressure position, such that when said control valve is in said first position and said changeover valve remains in said low-pressure position, as a result of said second signal pressure failing to switch said changeover valve to said high-pressure position, said high hydraulic oil pressure is supplied by said pressure reduction valve through said changeover valve to said solenoid valve.

7. A hydraulic control apparatus according to claim 6, wherein said control valve is integrally formed with a lockup shift valve for controlling to switch on and off a lockup clutch contained inside a fluid torque converter on an input side of said transmission such that said control valve can be switched to said second position by switching said shift valve to a lockup ON position.

* * * * *